May 20, 1930.  J. HAUK  1,759,506
BOTTLE WASHING MACHINE
Filed Sept. 14, 1926   6 Sheets-Sheet 3
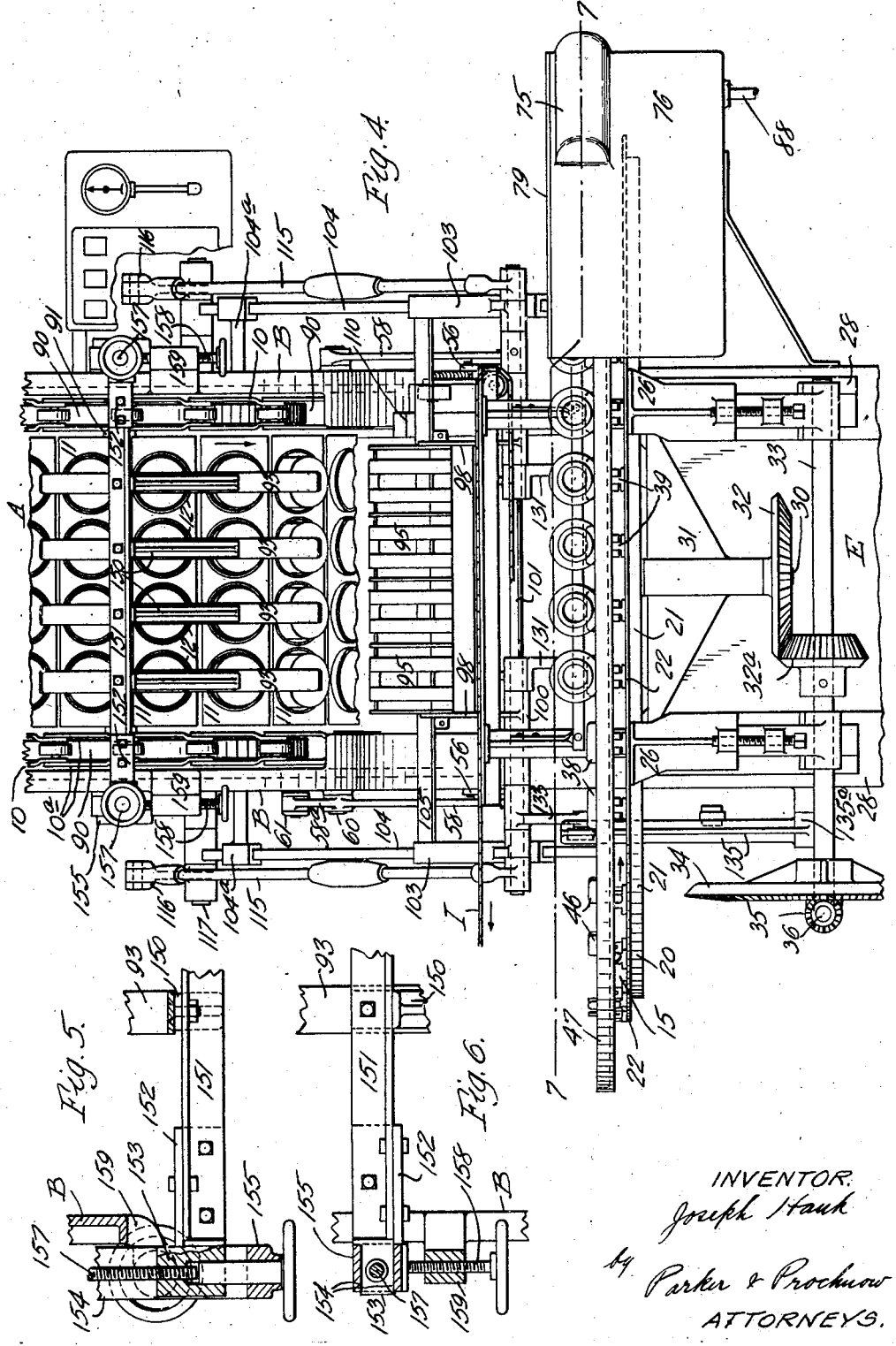
INVENTOR.
Joseph Hauk
by Parker & Prochnow
ATTORNEYS.

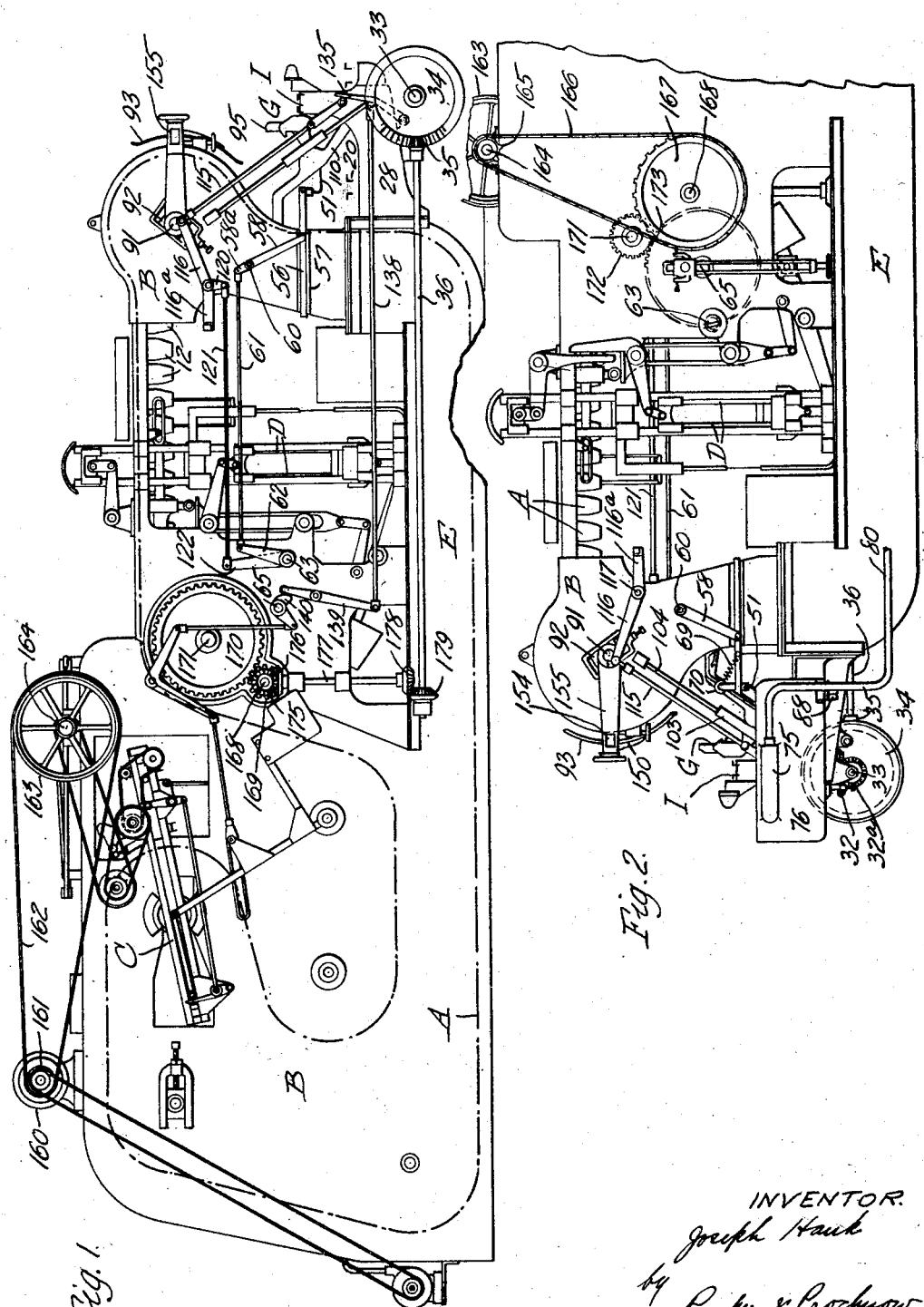

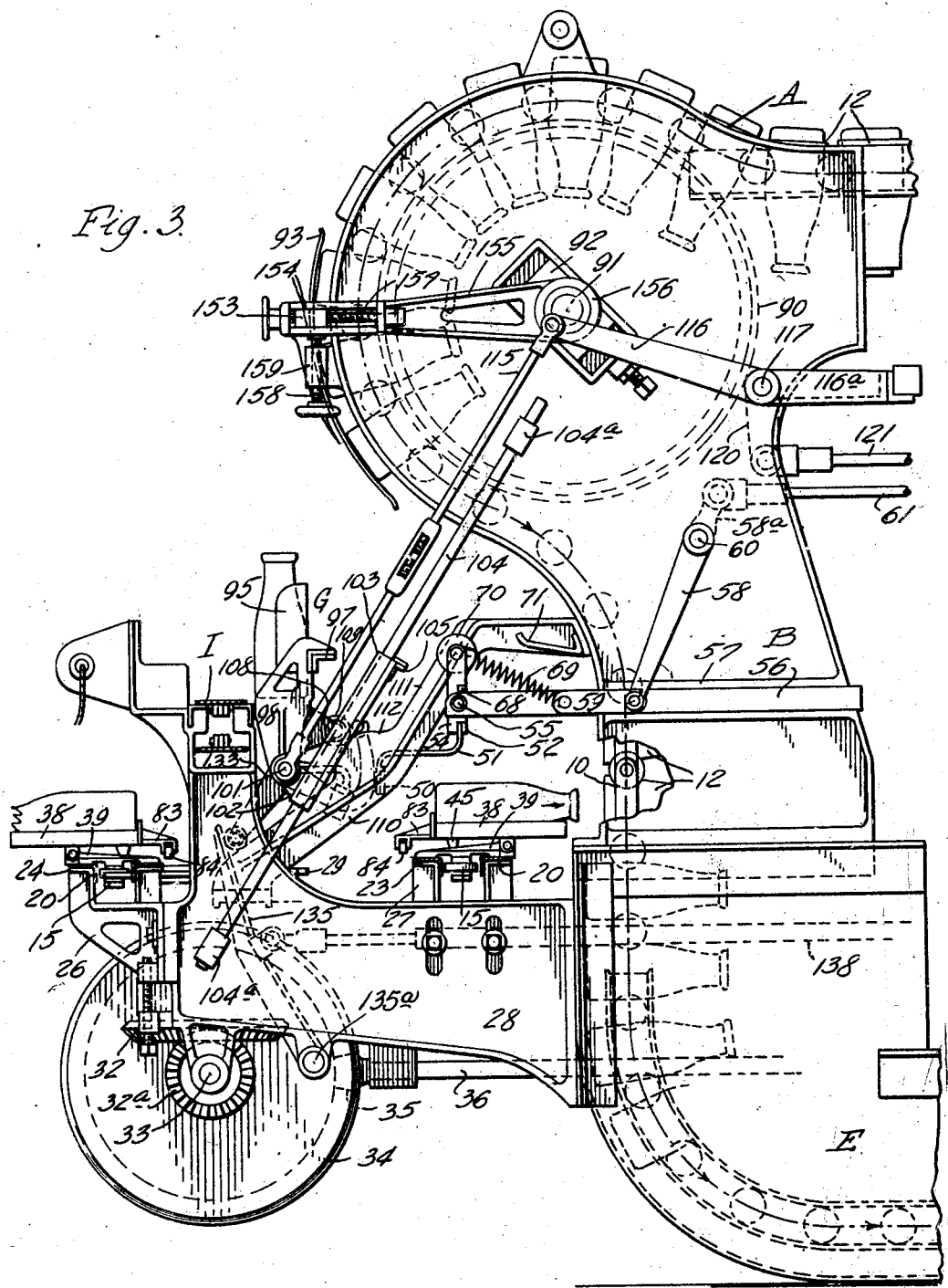

May 20, 1930.  J. HAUK  1,759,506
BOTTLE WASHING MACHINE
Filed Sept. 14, 1926  6 Sheets-Sheet 4
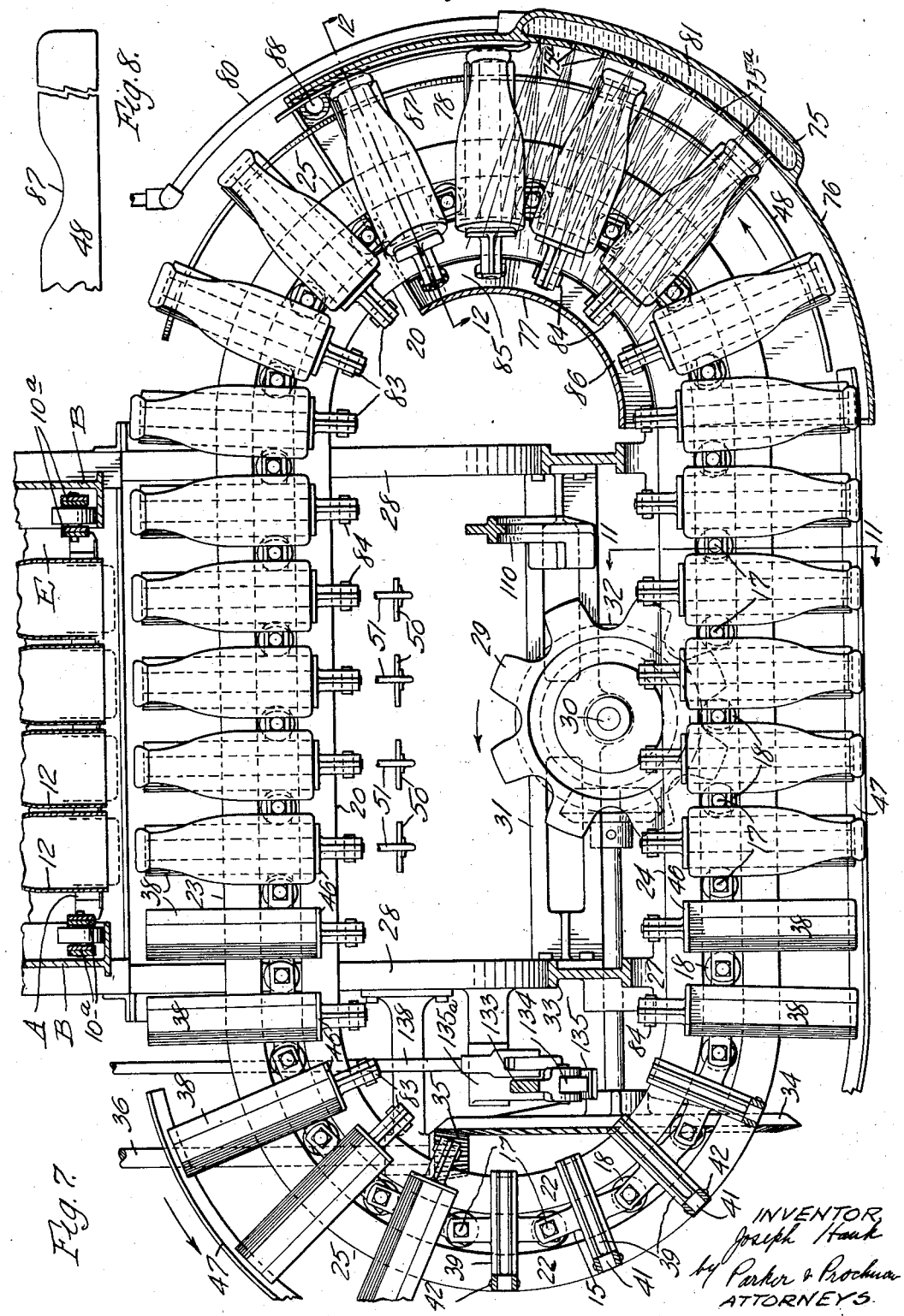

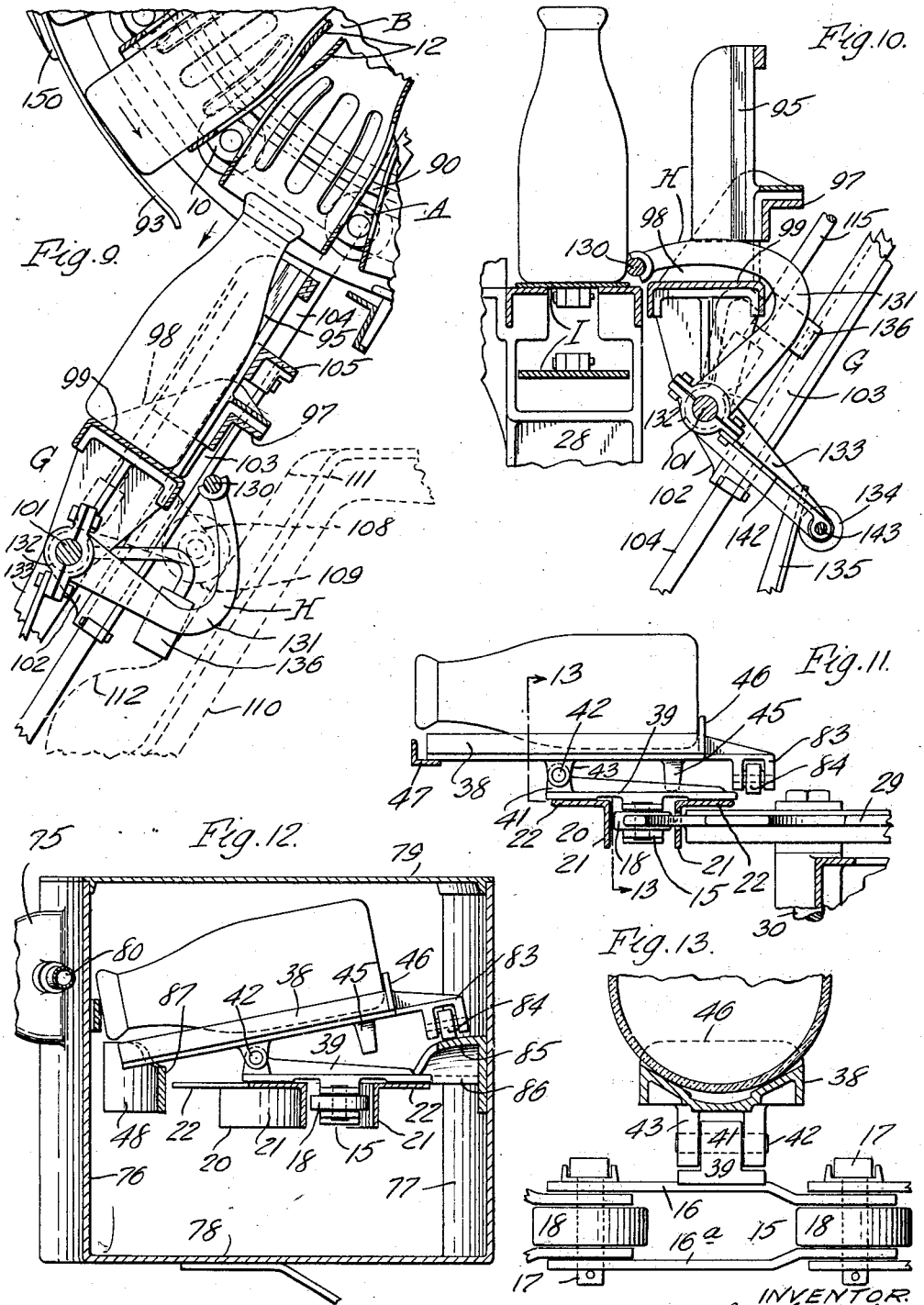

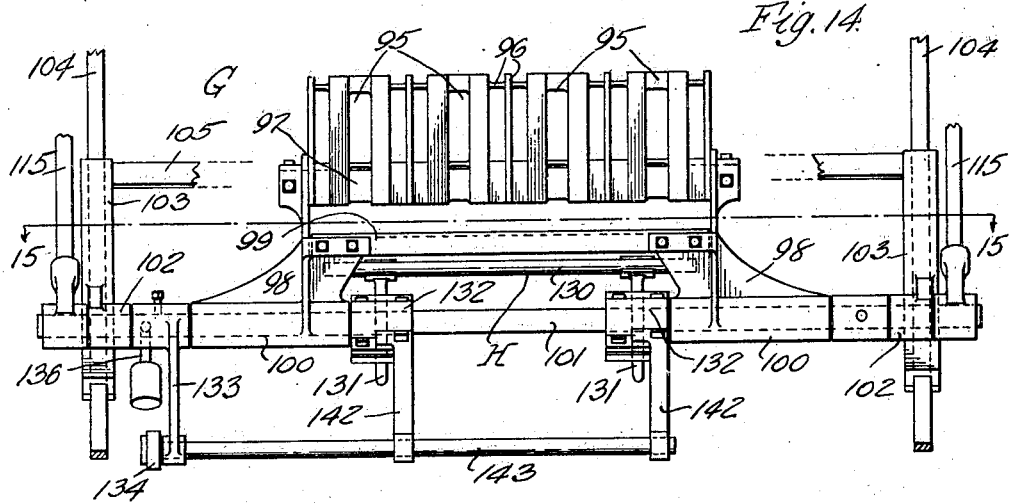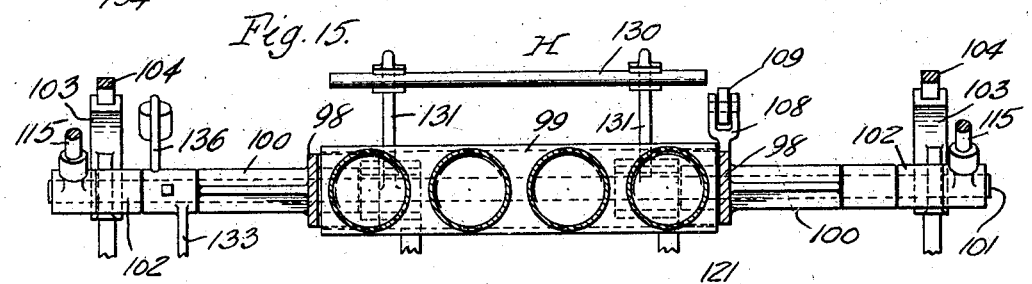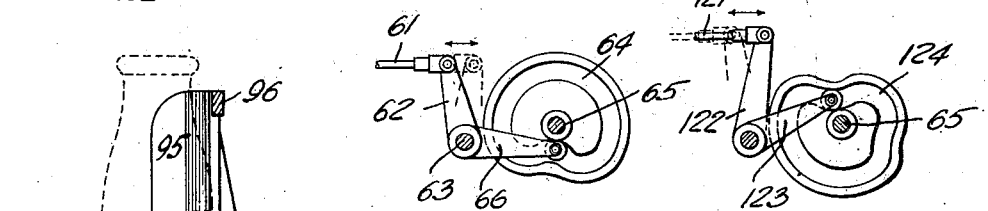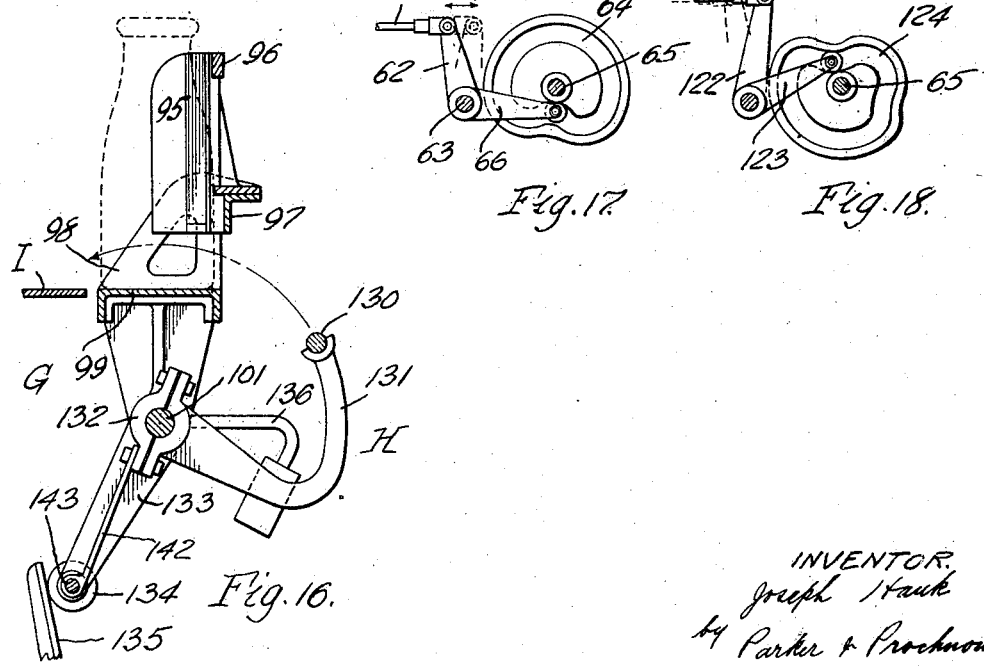

Patented May 20, 1930

1,759,506

UNITED STATES PATENT OFFICE

JOSEPH HAUK, OF BUFFALO, NEW YORK, ASSIGNOR TO RICE & ADAMS CORPORATION, OF BUFFALO, NEW YORK

BOTTLE-WASHING MACHINE

Application filed September 14, 1926. Serial No. 135,381.

This invention relates to improvements in bottle washing machines or apparatus of that kind which have an endless conveyor provided with pockets or holders for the bottles, and which is arranged to pass the bottles through the machine and present them to washing and brushing or other cleaning instrumentalities therein.

The principal objects of the invention are to provide an improved automatic bottle loading mechanism for delivering the bottles to the conveyor of a machine of the character described; also to provide an improved automatic bottle unloading or discharging mechanism for removing the bottles from said conveyor; also to provide means for rinsing the bottles and removing loose dirt and other accumulations therefrom before the bottles are loaded into the conveyor of the machine; and also to provide an improved guard device or mechanism for guiding the bottles from said conveyor to said unloading mechanism and to provide means of novel and improved construction for adjusting said guard device to accommodate the same to different sizes of bottles in said conveyor.

Other objects of the invention are to construct said bottle loading mechanism so that the bottles can be expeditiously placed by an operative on a part of the said mechanism located at a distance from the endless conveyor, said part being so disposed as to be free from other moving parts, so that the movements of the operator will be unobstructed to facilitate the quick placing of a large number of bottles thereon, and so that a single operative will have ample time to remove empty cases, bring filled cases adjacent the loading mechanism and load the bottles upon the machine; also to arrange said moving part of said loading mechanism in the form of a horizontally travelling feed carrier or chain having individual, horizontal bottle rests thereon adapted to receive and carry the bottles steadily and safely to the loading position in front of said conveyor; also to provide a preliminary rinsing or jet device adapted to act on the bottles while they are on said rests and are being passed to the loading position; also to construct said rests so that they may be tilted to discharge the rinsing fluid and foreign matter from the bottles; also to provide means for automatically tilting said bottle rests and bottles for this purpose and restoring the rests and the bottles thereon to their original horizontal positions before they reach the loading position; and also to provide novel means for automatically engaging the bottles as they reach the loading position for projecting or moving them quickly into the pockets of the conveyor; also to provide said bottle unloading mechanism with a carriage adapted to be inclined and moved to an upper position adjacent the bottle conveyor to receive the bottles and which is then movable with the bottles in said inclined position to a lower or bottle-discharging position; also to provide means for moving said carriage and bottles to an upright position during said descent by an easy, gradual movement so as to prevent jarring and displacing the bottles; also to provide a novel ejector or pusher device for discharging the bottles from said unloading carriage when said bottle discharging position is reached; also to construct said unloading carriage in a novel manner to hold the individual bottles in definite spaced positions thereon; and also to improve the construction of bottle washing machines or apparatus in the other respects hereinafter set forth and claimed.

In the accompanying drawings:

Fig. 1 is an elevation of one side of a bottle washing machine embodying the invention.

Fig. 2 is a fragmentary elevation of the opposite side thereof.

Fig. 3 is a side elevation of the front end of the machine on an enlarged scale, from the same side as Fig. 2, showing the bottle feeding and loading mechanism and the bottle unloading mechanism.

Fig. 4 is an elevation of part of the front or loading and unloading end of the machine.

Figs. 5 and 6 are respectively a fragmentary, horizontal section and a fragmentary, vertical section of the adjusting means for the bottle guide for guiding the bottles to the unloading mechanism.

Fig. 7 is a plan view, partly in section, of the bottle feeding and loading mechanism on line 7—7, Fig. 4, on an enlarged scale.

Fig. 8 is a detail view of a cam track for the feed device of the bottle feeding mechanism.

Fig. 9 is a vertical, longitudinal section, on an enlarged scale, of the bottle unloading mechanism, and adjacent parts of the machine, showing the bottle-unloading carriage in its upper position for receiving the bottles as they leave the bottle guide means and are discharged from the bottle holders of the endless conveyor of the machine.

Fig. 10 is a similar view of said carriage in its lower position and showing the pushing device or bottle discharging means in the act of removing the bottles therefrom.

Fig. 11 is a longitudinal, vertical section on line 11—11, Fig. 7, on an enlarged scale.

Fig. 12 is a transverse, vertical section of the bottle feeding and loading mechanism on line 12—12, Fig. 7.

Fig. 13 is a detail elevation of a portion of the bottle rest and chain of the bottle feeding means of the loading mechanism, on an enlarged scale, on line 13—13, Fig. 11.

Fig. 14 is a front elevation of the slidable bottle unloading carriage.

Fig. 15 is a sectional plan view thereof on line 15—15, Fig. 14.

Fig. 16 is a vertical, longitudinal section of the slidable bottle carriage of the unloading mechanism, similar to Fig. 10, but showing the parts before the bottles have been removed therefrom by the bottle discharge device.

Fig. 17 is a face view of the cam for actuating the reciprocating means for loading the bottles from the bottle feed means into the conveyor of the machine.

Fig. 18 is a face view of the cam for actuating the mechanism for reciprocating the bottle unloading carriage.

The bottle washing machine or apparatus illustrated in the drawings includes an endless conveyor A travelling longitudinally between the upright, spaced side frames B, which are provided with bearings for the transverse, horizontal shafts of sheaves or pulleys over which the conveyor passes. The movement of the conveyor is preferably intermittent. The conveyor A comprises opposite side chains 10, the corresponding links 10ª of which are connected by transverse members 11 each provided with a row of open-ended pockets or holders 12, each of which is adapted to support a bottle during the travel of the conveyor through the machine for presenting the bottles to the various washing and brushing instrumentalities, such as the outside brushing means C, inside brushing devices D and the various usual washing and spraying jets. The machine also preferably includes a soaking tank E containing a solution through which the conveyor passes so that bottles are immersed for a period of time to permit the foreign substances, such as grease, to be loosened before the bottles are presented to said cleaning devices. The machine thus organized is of well known form, and of itself forms no part of the present invention.

The bottle feeding and loading mechanism forming part of this invention comprises bottle feeding means upon which the bottles are placed by an operator at a distance from the endless conveyor A and which is adapted to advance the bottles to a position in front of and adjacent a set of empty bottle pockets 12 of said conveyor A, and automatic means for intermittently engaging successive groups of said bottles and moving them into said pockets as the intermittently moving conveyor A comes to rest.

Means for preliminarily rinsing the bottles with fresh water under pressure are positioned to act on the bottles while they are on the feeding means and moving towards the endless conveyor, means also being provided for draining and emptying the rinsed bottles before they reach and are loaded into said conveyor, whereby the loose dirt, sour milk and the like is removed from the bottles before they are immersed in the solution in the soaking tank. In this way a great saving in solution is effected and the required strength of the solution is maintained for a relatively long time.

The bottle feeding means before mentioned comprises a horizontally disposed, endless chain 15, Figs. 7, 11 and 13, having pairs of links 16, 16ª disposed one above another and connected by vertical pins 17, each of which acts as a journal for a guide roller 18 disposed between the links 16, 16ª. A horizontal table or track 20 is disposed at the front of the machine, being suitably formed of a pair of spaced angle bars having depending vertical flanges 21 and opposite, outwardly directed, horizontal flanges 22. At the front of the machine the conveyor A travels vertically downward, as shown in Figs. 3 and 7, and the track 20 has a straight, rear portion 23 passing transversely in front of and close to said vertical part of the conveyor A, and another straight portion 24 spaced at a distance forwardly of said portion 23 is connected thereto by opposite, semi-circular, end portions 25. The table 20 is stationarily supported, but is vertically adjustable on movable brackets 26, 27, adjustably secured to forwardly projecting extensions 28 on the side frame B, whereby the axes of the bottles on the feed chain may be properly alined with the axes of the empty bottle pockets of the conveyor A into which the bottles are to be projected. The chain 15 extends between said flanges 21 of the track with the rollers 18 engaging said flanges to guide said chain, which is advanced in the direction of the arrows, Fig. 7, by any suitable drive mechanism preferably including a sprocket wheel 29 which has teeth formed and adapted to extend between and engage the rollers 18, the adjacent portion of one flange 21 of the table being slotted for passage of the sprocket wheel. As shown, the sprocket wheel 29 is connected to a vertical shaft 30 journalled in a bracket 31 and rotated by bevel pinions 32 and 32ª, a transverse counter shaft 33, bevel gear 34 and pinion 35 and a longitudinal driven shaft 36. The sprocket wheel 29 is of course suitably connected to the shaft 30 so as to move endwise thereof when the table is adjusted vertically.

The bottle feed means of the loading mechanism further includes a plurality of substantially horizontal bottle rests 38, connected to said chain 15 and on which the bottles are placed at the front portion 24 of the table. The rests 38 support the bottles and advance them to the rear portion 23 of the table to a position in which they can be moved from the rests into the pockets 12 of the conveyor A. For this purpose, each upper link 16 of the chain 15 is provided with a transverse chain-supporting member 39, the opposite ends of which extend over and slidingly engage the top faces of the flanges 22 of the table. Each bottle rest 38 comprises a trough-shaped member extending transversely across the chain 15 and pivotally connected to the outer end of one of the supporting members 39, as by a pin 42, extending through lugs 41 and 43 on the supporting member and the bottle rest. The rest is thus adapted to swing in a vertical plane transversely of said chain. The rests, however, normally occupy a horizontal position, as shown in Figs. 7 and 11, this position being maintained by a depending foot 45 on each rest which engages the top face of the member 39. The rear or inner end of each rest 38 is closed by a vertical wall or stop 46, while the front end is left open, and when the rests are at the front portions of the table 20, the operator can easily and quickly place the bottles on the rests by grasping the bottle necks and placing the bottles on said rests with their bottoms engaging the rear stops 46. The weight of the rests is so distributed with reference to their pivots 42 that the rests will not tilt under ordinary conditions, but to prevent the accidental tilting of the rests, a guard rail 47 is preferably provided which extends in front of the table 20 parallel therewith, and around the left hand end, see Fig. 7, and upon which the front ends of the bottle rests engage and slide in their travel about the table. A curved bar 48 extending on edge around the right hand end of the table forms a substantial continuation of the guard rail 47.

In the particular construction shown, there are four bottle pockets 12 in each member 11 of the conveyor A, and as each group of four bottles advancing on the horizontal feed carrier 15 reaches a position opposite the four pockets of that member 11 of the conveyor, which is then at rest at this point, the automatic loading mechanism will be actuated to engage and simultaneously move the four bottles into said pockets.

In the embodiment of the invention illustrated, see Figs. 3 and 7, the loading mechanism includes a gang of movable arms or loading paddles 50 corresponding in number to the number of pockets 12 in each member 11, and which are adapted to be intermittently moved rearwardly and engage the bottoms of the bottles on those rests 38 opposite the conveyor pockets. Each paddle 50 is secured to the depending, forward end of a horizontal rod 51, the upwardly extending, rear end of which is secured to a transverse, horizontal bar 52. The ends of the bar 52 are rigidly secured to the lower ends of levers 54, pivoted at 55 to the front ends of horizontal, rearwardly extending slide bars 56. Each of said bars 56 is arranged to slide in a horizontal guideway 57 on the adjacent side frame B of the machine, and is adapted to move intermittently rearward in alternation with the intermittent movements of the conveyor A, for the purpose stated. For this purpose, a pair of rock arms 58 is provided. These arms are mounted, one at each side of the machine and each having its lower end pivotally secured to one end of a link 59. The other end of the link is pivoted to an adjacent slide bar 56. The upper end of each rock arm 58 is rigidly secured to a rock shaft 60 extending crosswise of the machine and journalled in said side frame B. An arm or extension 58ª of one of the arms 57 is operatively connected to one end of a rod or link 61 extending rearwardly at one side of the machine. Any suitable means may be used to actuate the rod 61 to cause the reciprocation of the slide bars 56. For example, an arm 62 pivoted to the rear end of said rod 61 is rigidly secured to a rock shaft 63, see Figs. 1 and 17, which is oscillated by a cam 64 secured on a cam shaft 65, and engaging a roller on the free end of another arm 66, on said rock shaft 63, Fig. 17, said parts being arranged to actuate the slide bars 56 during the time that the intermittent conveyor A is at rest.

When in the forward or at rest position, shown in Figs. 3 and 7, the loading paddles 50 are at some distance from the bottoms of the bottles at the rear of the table 20, and during the first part of their rearward movement the paddles travel at the same speed as their actuating slide bars 56. However, as the paddles are about to engage the bottles, they are given an accelerated motion for the purpose of quickly and positively moving the bottles into the pockets 12. This acceleration of the loading paddles is accomplished by the following means:

One of the levers 54, (the right hand one in the drawings) is provided with a fixed stop 68, Fig. 3, which is held against the top edge of the adjacent bar 56 by a tension spring 69 secured to said lever 54 and to the bar 56. In the rearward movement of the loading device, a roller 70 at the top of the lever 54 engages a cam or stop member 71 as the paddles are about to engage the bottles, and this cam is so positioned as to retard the rearward movement of the upper end of said lever. Therefore, the levers 54 will then swing about their pivots 55 in the further rearward movement of the slide bars 56, causing the paddles to move rearwardly relatively to the bars 56 at an accelerated pace for the remainder of the stroke of the bars 56. This acceleration causes the bottles to be quickly projected into the bottle holders of the conveyor A and prevents any possibility of the bottles lagging and engaging the edges of the pockets or other parts of said conveyor after it has started to advance. This movement of the paddles relatively to the bars 56 also enables a shorter stroke of the bars than would be the case if the paddles were arranged so as to move at the same speed as the bars for the entire stroke thereof. When the parts of the unloading mechanism are returned to their forward positions by the reciprocating means, the spring 69 will return the levers 54 and paddles to their normal positions.

For pre-rinsing the bottles after they have been placed on the feed carrier and before they arrive at the conveyor loading position, a plurality of jets are preferably employed. These jets, in the construction shown, formed by orifices 75$^a$ in a jet box or chamber 75 formed on or secured to the outer, upright side wall 76 of a rinsing hood, see Figs. 4, 7 and 12, which partly encloses the right hand end 25 of the loading table, and has an inner, upright wall 77, bottom wall 78 and a removable cover 79. Clean water under pressure is supplied by a pipe 80 to the jet box 75 and the orifices 75$^a$ are arranged so that water is projected into the mouths of the bottles and over the outer sides thereof as they are moved past the jets.

In order to discharge the rinse water and foreign matter from the bottles, means are provided for tipping the outer ends of the bottle rests 38 and the bottles thereon downwardly while in the rinsing hood. In the construction shown, each of the rests 38 is formed with a rearward extension 83, see Figs. 11 and 12, on which a roller 84 is journalled to rotate transversely of the length of the rest. These rollers are normally inactive, but as the bottle rests and bottles leave the pre-rinsing position in the hood, the rollers 84 successively engage an upwardly projecting cam 85 formed on a cam track 86 in the hood, thereby lifting the rests and the bottles thereon to inclined positions so that the contents of the bottles will be discharged. The curved guard rail 48 is cut away at 87, see Figs. 7, 8 and 12, to permit the described tilting of the bottle rests, the rail however, being continued for a distance beyond the cut-away part and having a cam edge to engage and restore said rests to their horizontal positions before they reach their unloading station. The bottom wall 78 of the hood is provided with a drain 88, Fig. 7, for the discharge of the rinsing water and foreign matter.

The mechanism for unloading or removing the bottles from the bottle conveyor A after the bottles have been subjected to the washing and brushing devices will now be described. While this mechanism, in the present disclosure, is preferably located at the front end of the machine to which the bottles are returned by the conveyor A after being cleansed, it is possible to arrange said mechanism elsewhere on the machine if desired.

As shown in Figs. 1-4, the side chains 10 of the bottle conveyor A are guided forwardly and pass downwardly at the front of the machine over a pair of sheaves 90 secured adjacent the side frame B on a transverse shaft 91 journalled in bearings 92 which are adjustably mounted on said side frames for tightening the conveyor chains when necessary. A plurality of adjustably supported spaced, guard members or bars 93, curved substantially concentrically with the axis of said shaft 91 are disposed in the vertical planes of and spaced from the open outer ends of the longitudinal rows of bottle pockets 12 of the conveyor in front of the sheaves 90. The construction of the adjustable guides 93 will be described later. During the passage of the conveyor around the lower, front portions of the sheaves 90 and before it reaches the bottle loading position the bottles tend to slide out of their pockets by gravity. The lower portions of the guard members 93, however, are arranged to engage the bottoms of the bottles and retain the bottles in their respective pockets for a short distance. The unloading mechanism is adapted to receive the bottles as they pass off the ends of said guard members, see Fig. 9, the parts being so arranged that the bottles slip out of their pockets in a downwardly and forwardly inclined position.

The unloading mechanism includes a sliding carriage G adapted to reciprocate along an upwardly and rearwardly inclined path in line with the bottles leaving the conveyor A, moving between said bottle receiving position and a lower bottle discharging position, means for gradually and gently turning the carriage and the bottles to an upright position during said downward movement, and an ejector H which is adapted to engage said bottles after the carriage comes to rest in its lower, upright position and move them from the carriage to the upper run of a transversely moving, horizontal conveyor I of any suitable kind adapted to carry the bottles from the machine to any desired point, for instance, to a bottle filling and capping machine.

As shown, the carriage G comprises a plurality of spaced, trough-like pockets, seats or guides 95 corresponding in number with the pockets 12 in each member 11, and disposed in a substantially upright position in alinement with said conveyor pockets 12. The pockets 95 are connected by upright and transverse webs 96 and are secured to an angle bar 97 extending transversely across the back of said pockets. The opposite ends of the bar 97 are rigidly attached to the upper ends of a pair of brackets 98. Extending between and secured to said brackets, a short distance below the lower ends of the pockets 95, is a transverse platform 99 on which the bottoms of bottles in said pockets rest to support the bottles. The lower ends of said brackets are provided with bearing sleeves 100 loosely journalled on a transverse, horizontal shaft 101, so that the carriage can turn freely as a unit about said shaft. The opposite ends of the shaft 101 extend laterally beyond the side frames B and are journalled in forwardly projecting, pivot lugs 102 on a pair of sleeves 103, each of which embraces and is adapted to slide up and down on a fixed, straight guide rod 104 inclining rearwardly, upwards and secured as by posts 104ª on the adjacent side frame B and its extension 28. The sleeves 103 are preferably connected above the shaft 101 by a transverse bar 105.

One of the brackets 98, for example, the right hand one in Fig. 15 is provided with a rearwardly extending lug 108 on which is journalled a roller 109 adapted to travel on a fixed cam track 110 having an upper, straight, inclined portion 111 and a lower or convex forward projection 112. The cam track 110 is suitably secured at its lower and upper ends to the adjacent bracket 31 and side frame B. The weight of the carriage G acts to hold the roller 109 against the cam track 110 at all times.

In operation, the carriage G is moved upwardly on the guide rods 104 to the position shown in Fig. 9, adjacent the conveyor A, just before a row of bottles in the conveyor pockets 12 passes off the ends of the guides 93 and before said conveyor comes to rest. At this time the roller 109 of the carriage G engages the straight part 111 of the cam track, and consequently the carriage is in an inclined position, as shown. As the conveyor comes to rest, the bottles in one of the transverse rows of pockets will pass off of the ends of the guards 93 and will slide by gravity out of said pockets into the seats of the carriage G and rest with their bottoms on the carriage platform 99. The carriage G now moves downwardly on the guides 104 with the bottles inclined, until the roller 109 engages the convex cam portion 112, and in the continued downward movement the cam will force the roller forwardly so that the carriage G will turn on the shaft 101 and assume a vertical position with the platform 99 in horizontal alinement with the conveyor I, as in Figs. 3 and 16. The ejector H is then automatically actuated to shove the bottles forwardly from the platform 99 upon said conveyor, after which the carriage G is returned to its upper position to receive another group of bottles. The complete cycle of movements just described, including the operation of the ejector H takes place during each intermittent movement of the conveyor A, so that when the carriage again reaches its upper position the next row of pockets 12 will be in position to deposit bottles thereon. Any suitable mechanism may be used for reciprocating the carriage G as described, that shown in the drawings comprising a pair of links or rods 115 extending substantially parallel to and adjacent the guide bars 104 and having their lower ends pivotally secured to the ends of the horizontal shaft 101 of the carriage G. The upper ends of the rods 115 are pivoted to the outer ends of forwardly extending arms 116 one of which is rigidly secured adjacent each side frame B to a transverse rock shaft 117 journalled in said frame. The weight of the carriage G is preferably counterbalanced by weights on the ends of rearward extensions 116ª of the arms 116, and another fixed arm 120 on said shaft 117, having its free end pivoted to a rearwardly extending push rod 121, is adapted to rock the shaft 117 and effect the reciprocation of said carriage G through the medium of connected rock arms 122, 123 journalled on the rock shaft 63 before mentioned. The arm 122 is pivoted to the rear end of the push rod 121, while the outer end of the arm 123 is provided with a roller working in a cam groove of a cam 124 on the cam shaft 65, see Figs. 1 and 18.

The ejector H illustrated includes a horizontal transverse bar 130 of a length adapted to pass between the carriage brackets 98 and beneath the bottom edges of the pockets 95 to engage the bottles on the platform 99 when the carriage is in the position shown in Figs. 3 and 16. The bar 130 is secured to the upper ends of a pair of spaced, curved arms 131 secured at their lower ends as by clamps 132 to the carriage shaft 101. Rigidly secured to and extending downwardly from said shaft 101 is an arm 133 having at its lower end a roller 134 which bears against the upper end of an actuating lever 135 pivoted at 135ª on one of the frame extensions 28. The ejector bar 130, arms 131 and arm 133 normally occupy the lower position shown in Figs. 3, 9 and 16 with reference to the carriage G, being held in this position with the roller 134 engaging the lever 135, by a weighted arm 136 secured to the arm 133. The lever 135 is connected by a rearwardly extending link 138, Fig. 1 at one side of the machine to a lever 139 pivoted on the side of the machine and having at one end a roller engaged by a cam 140 on the cam shaft 65, before mentioned. By the operation of this cam, the link 138 is pulled rearwardly, after each movement of the carriage G, to the discharging position shown in Figs. 3, 9 and 16, thereby moving the lever 135 and causing the upward and forward bottle ejecting movement of the ejector bar 130, as described, see Fig. 10. As the rotation of the cam 140 continues, the rod 138 is advanced and the ejector retracted to its lower position through the weighted arm 136 before the carriage G starts its upward movement. The weighted arm 136 also causes the roller on the lever 139 to remain in contact with the cam 140 at all times, and thus said cam and lever act as a stop to limit the rearward movement of the ejector; also the roller 134 is positively held in engagement with the lever 135 so that there is no lost motion between the various parts of the ejector mechanism.

In the ejector construction shown, the clamps 132 are provided with depending extensions 142 secured to a cross rod 143 which is also secured to the lower end of arm 133 to overcome torsional strains on the shaft 101 and ensure the parallelism of the rod 130 with said shaft to properly engage the bottles on the platform 99.

In accordance with this invention, the bottle guard members or bars 93 are adjustably mounted so as to be positioned at different distances from the bottle conveyor A to suit different sizes of bottles. These guards are preferably supported by arms which are mounted and pivotally adjustable about the axis of the conveyor sheaves 90 in order that the guards 93 and their adjusting and supporting devices may move with the sheaves when the shaft bearings 92 are shifted for adjusting the tension of the bottle conveyor. By this arrangement it is unnecessary to readjust the guards when the position of the sheaves is changed so long as one size or bottle is being operated on.

As shown in Figs. 3 and 6, the guide bars 93 are secured between their ends to curved stiffening arms or brackets 150, the upper ends of which are rigidly secured to a transverse, horizontal bar 151. Secured to the ends of the bar 151 are end fittings 152 provided with a threaded sleeve or nut 153 arranged to slide in horizontal guides 154 on supporting arms 155. These arms 155 extend rearwardly alongside the side frames B of the machine and terminate in bearing sleeves 156 surrounding and adapted to turn on the extended ends of the shaft 91. Each arm 155 has journalled in its front portion to turn without endwise movement, a horizontal adjusting screw 157 having a screwthreaded engagement in the nut 153. By appropriately turning these adjusting screws 157, which are provided with hand wheels, the guard bars 93 can be adjusted towards or from the peripheries of the sheaves 90 and the conveyor A. By this arrangement the bars 93 always remain substantially concentric with the sheaves 90, regardless of the adjustments of the bearings 92, and the bars only require adjusting when bottles of different sizes are being operated on. In order to permit the lower ends of the guard bars 93 to be properly positioned relative to the unloading mechanism, means are provided for raising or lowering the outer ends of the supporting arms 155 to a limited extent. The means shown for this purpose comprises screws 158 adjustable vertically in forwardly extending, screw threaded lugs 159, fixed on the front edges of the side frames B. The ends of the screws project upwardly and bear against the under sides of said arms, which rest thereon by their own weight. The screws have hand wheels for turning them, and by appropriate adjustments of the screws the lower ends of the bars 93 can be quickly and accurately positioned as required. Any other suitable means may, however, be provided for this purpose.

Any suitable drive mechanism may, of course, be employed for operating the various devices hereindescribed, but that shown in Figs. 1 and 2 as desirable will be briefly described.

An electric motor 160 mounted on the rear of the machine is connected by its pulley 161 and belt 162 to a pulley 163. The pulley 163 is fixed to one end of a transverse drive shaft 164, having at its outer end a sprocket 165 connected by a chain 166, Fig. 2, to another sprocket 167 on one end of a transverse shaft 168 journalled in the side frames B. The other end of said shaft 168 is provided with a pinion 169 meshing with a large gear 170 on one end of another transverse shaft 171. This shaft 171 has on its opposite end a pinion 172 adapted to drive a gear 173 secured to the cam shaft 65 before-mentioned. The shaft 168 is also provided outwardly beyond the pinion 169 with a bevel 175 meshing with a pinion 176 on the upper end of a vertical shaft 177 journalled in bearings on the side frame. The lower end of the shaft 177 is connected by bevel pinions 178, 179, to the rear end of the shaft 36 for actuating the bottle feed carrier 15.

The machine is organized so that each revolution of the cam shaft actuates all of the various elements of the machine so that they operate on the bottles during the time that the intermittent conveyor A is at rest.

I claim as my invention:

1. In a bottle washing machine, the combination of a conveyor movable in a vertical plane and adapted to support and pass bottles through said machine, an endless travelling feed chain, a table having a horizontal top formed with a recess having a portion extending in transverse relation to said conveyor at a distance therefrom and another similar portion adjacent said conveyor, and having end portions connecting said transverse portions, said chain having parts extending into said table recess and parts bearing on said table top respectively, for guiding and supporting said chain, a plurality of bottle rests mounted on said chain and each of which is adapted to have a bottle placed thereon while said chain is passing through said first mentioned portion of said table recess, means for advancing said chain to carry the bottles on said rests adjacent said conveyor, and means for then engaging said bottles and projecting them into said conveyor.

2. In a bottle washing machine, the combination of a movable conveyor adapted to support and pass bottles through said machine, a travelling feed carrier on which bottles are placed and which is adapted to advance the bottles to a position adjacent said conveyor, and intermittently operable means adapted to engage the bottles as they reach said position and move them into said conveyor, said means comprising a member slidable on said machine, a bottle engaging device pivoted to said member, means for moving said sliding member and said bottle engaging device towards said bottles, and means for swinging said bottle engaging device on its pivot as it is about to engage said bottles to cause the same to engage said bottles at an accelerated speed relative to the speed of said sliding member to move said bottles quickly into said conveyor.

3. In a bottle washing machine, the combination of a movable conveyor adapted to support and pass bottles through said machine, a travelling feed carrier on which bottles are placed and which is adapted to advance the bottles to a position adjacent said conveyor, and intermittently operable means adapted to engage the bottles as they reach said position and move them into said conveyor, said means comprising a member slidable on said machine, a bottle engaging device pivoted to said member, resilient means connected to said bottle engaging device for holding it in normal position, means for moving said sliding member and said bottle engaging device towards said bottles, means for engaging said device as it is about to engage said bottles to swing said device about its pivot against the action of said resilient means and towards said bottles, whereby said device is caused to engage the bottles at an accelerated speed relative to the speed of said sliding member to move said bottles quickly into said conveyor, and means for returning said sliding member to initial position.

JOSEPH HAUK.